United States Patent [19]

Slade et al.

[11] Patent Number: 4,657,770
[45] Date of Patent: Apr. 14, 1987

[54] ACCELERATED STALING OF STARCH BASED PRODUCTS

[75] Inventors: Louise Slade, Monsey; Rhoda Oltzik, Spring Valley; Robert E. Altomare, Yonkers, all of N.Y.; Darrell G. Medcalf, Hummelstown, Pa.

[73] Assignee: General Foods Corporation, White Plains, N.Y.

[21] Appl. No.: 749,372

[22] Filed: Jun. 27, 1985

[51] Int. Cl.4 .............................................. A21D 13/00
[52] U.S. Cl. .................................... 426/549; 426/444; 426/465; 426/627; 426/497
[58] Field of Search ............... 426/390, 391, 418, 444, 426/465, 520, 524, 497, 549, 618, 627, 461, 462, 507, 508, 509, 510

[56] References Cited

U.S. PATENT DOCUMENTS

| | | | |
|---|---|---|---|
| 3,870,806 | 3/1975 | Capossela et al. | 426/465 |
| 4,218,480 | 8/1980 | Dyson et al. | 426/549 |
| 4,303,687 | 12/1981 | Ratjen | 426/497 |
| 4,364,961 | 12/1982 | Darley et al. | 426/549 |
| 4,423,078 | 12/1983 | Darley et al. | 426/549 |

FOREIGN PATENT DOCUMENTS 59-7294  2/1984  Japan ................................. 426/549

OTHER PUBLICATIONS

Tressler, The Freezing Preservation of Foods, vol. II, AVI Publishing Co., Westport, Ct., 1957, pp. 312–335.
Desrosier, Elements of Food Technology, AVI Publishing Co., Westport, CT, 1977, pp. 496–512.
Meisner, Bakers Digest, 27(6) 17, 1953.
Kent Jones et al, Modern Cereal Chemistry, Northern Publishing, Liverpool, England, pp. 295–302.

Primary Examiner—Raymond N. Jones
Assistant Examiner—Carolyn Paden
Attorney, Agent, or Firm—Thomas A. Marcoux; Thomas R. Savoie; Daniel J. Donovan

[57] ABSTRACT

The process of staling of starch based food products, including baked or extruded breads and cooked pasta or rice, can be accelerated over the conventional method of holding at room temperature by use of a time-temperature-moisture protocol whereby, for example, freshly baked or extruded bread is cooled and subsequently heated to allow the formation of a unified crystalline structure characteristic of staled bread.

26 Claims, No Drawings

ACCELERATED STALING OF STARCH BASED PRODUCTS

FIELD OF THE INVENTION

This invention relates to a process for the accelerated staling of starch based products, more particularly to a process for staling bread which takes considerably less time than staling by the conventional method of holding at room temperature, as a means to enhance the structural, mechanical, or organoleptic properties thereof.

BACKGROUND OF THE INVENTION

Bread particles, in the form of crumbs and croutons, are used in a variety of food products, for example, fish coatings, chicken coatings, onion rings, meat patties, stuffing mixes, and as garnishes. The bread particles are generally produced by baking bread according to conventional yeast leavening procedures, allowing the bread to stale and then comminuting the stale loaf to the desired particle size. The time required for conventional staling is normally 1 to 3 days, depending on moisture content of the product, necessitating large storage space for loaves while staling occurs, and then rehandling of the same, with interrupted unit process thus being involved.

In an attempt to abbreviate this 3-day staling process it was suggested that gaseous materials such as carbon dioxide could be utilized in the leavening process instead of yeast. Such a process, describing the utilization of continuous mixers in combination with added gaseous materials, was described in U.S. Pat. No. 3,041,176 to Baker. That process reduced substantially the overall baking time for a bread product as compared to conventional procedures by premixing flour and water to form a slurry which is transferred to a continuous mixer to which gas is introduced to form a continuous dough. The gas proports to raise the dough thereby avoiding the use of yeast.

While this process is useful in reducing the overall baking time as compared to conventional procedures, the process of premixing components into a slurry is time consuming and forecloses the use of yeast or other ferments for their flavor and texture enhancing properties.

SUMMARY OF THE INVENTION

The process of this invention permits a much faster, more efficient method of staling starch based products after partial or full gelatinization and pasting than can be achieved by the conventional method which requires a holding time of many days between the partial or full baking and the drying/toasting steps.

The process of this invention involves utilization of a temperature/time/moisture protocol which is much more amenable and practically applicable than conventional methods. Starch based products, including pasta, rice, and bread, preferably freshly based or extruded bread products, are maintained at a temperature for a time period sufficient for the initial formation of pre-crystals within the sample. The sample is then heated to a temperature and for a time period sufficient to propagate these pre-crystals into a unified crystalline structure which results in a firming of the bread. This temperature/time/moisture protocol allows an acceleration of the overall crystallization process at a rate even greater than the maximum rate which can be obtained with a single constant temperature. The organoleptic properties (i.e., smoothness, pastiness, cohesiveness, which are desirable qualities in conventionally staled bread) of samples staled by the accelerated protocol have been judged to be extremely pronounced, even more so than in the conventionally staled product. By manipulating the moisture level in the extruded ropes it was possible to stale the product in 8 hours. Staling within 5 hours had been achieved at a moisture level of 36%.

DETAILED DESCRIPTION OF THE INVENTION

Native starch granules are discrete bodies which are partially crystalline glassy polymer systems. Within these spatially isolated bodies amylopectin exists in the form of a fringed micelle. The glassy starch which surrounds the micelles is partly composed of the high molecular weight amylopectin fringe and partly the fibrillar and random amylose for non-waxy starches, as in common wheat flours. After gelatinization and pasting of the native starch, staling (as of freshly baked bread) occurs due to the reformation and maturation of this partially crystalline amylopectin network for waxy starches, with partial contribution from amylose for non-waxy starches. A sufficient amount of total moisture is required such that there exists some amount of freezable water, if water is the only plasticizer and solvent. An equivalent free volume may be supplied by an alternative plasticizer or co-solvent mixture.

The rate of nucleation of critical crystalline nuclei increases as the temperature is decreased. A maximum rate is obtained at a temperature just above where the non-ice portion of the sample or product undergoes a glass transition from a mobile fluid state to an amorphous solid state.

The rate of crystal growth increases with temperature. A maximum rate is obtained at a temperature where the rate of crystal growth equals the rate of crystal melting.

In the present invention it is possible to define a temperature/time/moisture protocol which accelerates staling compared to the commercial process because nucleation (formation of pre-crystals) is optimized below room temperature while propagation (crystal growth) is optimized above room temperature so that low temperature holding followed by high temperature holding acclerates staling compared to the same total time spent only at room temperature.

The present invention provides an improved process for the manufacture of staled starch based products including partially or fully cooked pasta with a moisture content of from 30–70% and partially or fully cooked rice with a moisture content of from 30–75%, having characteristics organoleptically comparable to starch based products staled by the conventional method of holding at room temperature (25° C.) without the necessity of an extended holding period. For purpose of convenience, the process of the present invention will be described with reference to the treatment of freshly baked bread or freshly extruded bread dough.

The process of this invention involves a two step protocol which comprises cooling freshly baked or extruded bread dough for a period of time sufficient to allow the formation of minute pre-crystals within the bread product (nucleation) followed by heating the bread product for a period of time sufficient to allow maturation of the pre-crystals into fully formed crystals (propagation) at a relative humidity of about 60% to about 100%.

The basic components of any dough are flour, yeast and water lipid materials, salt, and sugars. The term flour refers to any farinaceous flour or meal used alone or in combination with other flours and meals. By freshly extruded dough is meant that dough which is prepared by feeding a flour and water into an extruder in amounts effective to prepare a dough having a moisture content within the range of 27 to 45%; mixing and kneading the flour, water and other optional ingredients to prepare a homogeneous dough and extruding the dough in rope form. The dough may either be expanded according to the traditional yeast leavening method or by incorporation of a gas forming agent which will release a gas during extrusion to develop the desired aerated structure. The starch based product, which is preferably a freshly extruded bread dough, may be a partially or fully baked bread. Most preferably the starch based product is fully baked bread produced by extrusion.

In the preferred embodiment of this invention, the freshly extruded ropes with a moisture content of about 27% to about 45% were cut and sealed in plastic bags. The samples are then held for a time period of from about 2 hours to 24 hours to allow formation of pre-crystals (nucleation) at a temperature of from −10° C. to about 21° C. Preferably the products are held for about 4 hours to about 10 hours at a temperature of from about 5° C. to about 10° C. The samples are then heated to a temperature from about 30° C. to about 80° C. for a time period from about 2 hours to about 20 hours and more preferably from about 4 hours to 10 hours at a temperature of from 35° C. to about 50° C., to allow propagation of the crystals at a relative humidity of about 60% RH to about 100% RH, and more preferably of about 70 to 90% RH.

After the bread products have been staled, they may be further treated by comminution and air drying or they can be toasted, ground and oven dried. These staled bread products are then comminuted, preferably by dicing, to the desired shape and size and then air dried for a time period from about 30 minutes to about 90 minutes at a temperature of from about 21° C. to about 52° C. and more preferably at a temperature from about 32° C. to about 48° C. for a time from about 40 minutes to about 50 minutes to produce an air dried product.

An oven dried product can be produced by toasting the staled product at a temperature from about 177° C. to about 246° C. for a time period of from about 2 to about 12 minutes and more preferably from about 6 to 10 minutes, followed by grinding and oven drying at a temperature of from about 93° C. to about 232° C. for a time period of from about 5 minutes to about 10 minutes, and more preferably at a temperature of from 107° C. to 135° C. for a time of from about 6 to about 8 minutes.

EXAMPLE 1

Samples of bread were prepared by extrusion with a moisture content of from 27% to about 45%, typically about 30%, and staled according to the accelerated protocol for 4 hours at 4° C. followed by heating at 42° C. for 4 hours at 80% relative humidity. The stale ropes were toasted for 8 minutes at 218° C., ground and oven dried for 6 minutes at 120° C. An unstaled control was prepared according to the same formula. The staled samples were judged to be smoother, pastier, and more cohesive than the controls.

EXAMPLE 2

Samples of bread were prepared according to the method of Example 1 and staled according to the same accelerated protocol. The staled ropes were then diced and air-dried for 45 minutes at 37° C. An unstaled control was prepared according to the same formula. The staled samples were judged to be smoother, pastier, and more cohesive than the controls of this example. The staled samples of this example were judged to be smoother, pastier, and more cohesive than the staled samples of Example 1.

EXAMPLE 3

Samples of bread were prepared by baking in a convection oven or microwave oven to a final moisture content of from about 27% to about 52%, typically about 35% to 45%, and staled according to the accelerated protocol for 4 hours at 4° C. followed by heating at 42° C. for 4 hours at 80% relative humidity. An unstaled control was prepared according to the same formula. The baked bread was toasted, diced, and oven dried according to the method of Example 1 or diced and air-dried according to the method of Example 2. The staled samples were judged to be smoother, pastier, and more cohesive than the controls.

EXAMPLE 4

Samples of noodles were prepared by cooking freshly pressed pasta dough in boiling water to a final moisture content of from about 30% to about 70%, typically about 65%, and staled according to the accelerated protocol for 4 hours at 4° C. followed by heating at 42° C. for 4 hours at 80% relative humidity. The staled noodle product resulted in a firmer and less sticky product upon subsequent reheating for consumption, compared to a typical precooked noodle product.

EXAMPLE 5

Samples of rice were prepared by cooking raw white or brown rice in boiling water to a final moisture content of from about 30% to about 75%, typically about 68%, and staled according to the accelerated protocol for 4 hours at 4° C. followed by heating at 42° C. for 4 hours at 80% relative humidity. The staled rice product resulted in a firmer and less sticky product upon subsequent reheating for consumption, compared to a typical precooked rice product.

We claim:

1. The process for the accelerated staling of starch based products by crystallization after partial or full gelatinization comprising the steps of:
    (a) maintaining said starch based product at a temperature of about −10° C. to about 21° C. for a period of time sufficient to allow the formation of minute pre-crystals within said starch based product; and
    (b) heating said starch based product from step (a) to a temperature of about 30° C. to about 80° C. for a period sufficient to form crystals from said pre-crystals at a relative humidity of about 60% to about 100% RH.

2. The process according to claim 1 wherein the starch based product is a partially or fully baked bread.

3. The process according to claim 1 wherein the starch based product is a fully baked bread.

4. The process of claim 2 wherein the moisture content of the baked bread is from about 27% to about 52%.

5. The process according to claim 1 wherein the starch based product is a partially or fully cooked pasta.

6. The process of claim 5 wherein the moisture content of the pasta is from about 30% to about 70%.

7. The process according to claim 1 wherein the starch based product is a partially or fully cooked rice.

8. The process of claim 7 wherein the moisture content of the rice is from about 30% to about 75%.

9. The process according to claim 1 wherein the starch based product is a bread product formed after extrusion.

10. The process according to claim 9 wherein the extruded bread product, exclusive of water, comprises a mixture of flours, lipid materials, salt, and sugars.

11. The process of claim 9 wherein the moisture content of the extruded bread is from about 27% to about 45%.

12. The process according to claim 1 wherein the effective temperature range for pre-crystal formation in the starch based product in step (a) is from 5° C. to 10° C.

13. The process according to claim 1 wherein the effective temperature range for crystal formation in the starch based product in step (b) is 35° C. to 50° C.

14. The process according to claim 1 wherein the time period for maintaining the starch based product of step (a) is from 2 to 12 hours.

15. The process according to claim 14 wherein the time period for step (a) is from 4 to about 8 hours.

16. The process according to claim 1 wherein the time period for heating said starch based product in step (b) is from 2 to about 10 hours.

17. The process according to claim 16 wherein the time period for step (b) is from 4 to about 6 hours.

18. The process according to claim 9 further comprising the steps of comminution and air drying said starch based product in step (b) for a period of about 30 to 90 minutes at a temperature of about 21° C. to 52° C.

19. The process according to claim 18 wherein the temperature range for air drying is from 32° C. to 43° C.

20. The process according to claim 18 wherein the time period for air drying is from 40 to 50 minutes.

21. The process according to claim 18 wherein the comminution is accomplished by dicing.

22. The process according to claim 9 further comprising the steps of toasting said starch based product of step (b) for a period of about 2 to 12 minutes at a temperature from about 177° C. to 246° C., followed by comminution and oven drying for a period of time of about 5 to 10 minutes at a temperature of about 93° C. to 232° C.

23. The process according to claim 22 wherein the time period for toasting is from 6 to 10 minutes.

24. The process according to claim 22 wherein the comminution is accomplished by grinding.

25. The process according to claim 22 wherein the temperature for oven drying is 107° C. to 135° F.

26. The process according to claim 22 wherein the time period for oven drying is 6 to 8 minutes.

* * * * *